(No Model.) 2 Sheets—Sheet 1.
M. J. WISE.
FEEDER FOR CORN SHELLERS.
No. 578,435. Patented Mar. 9, 1897.
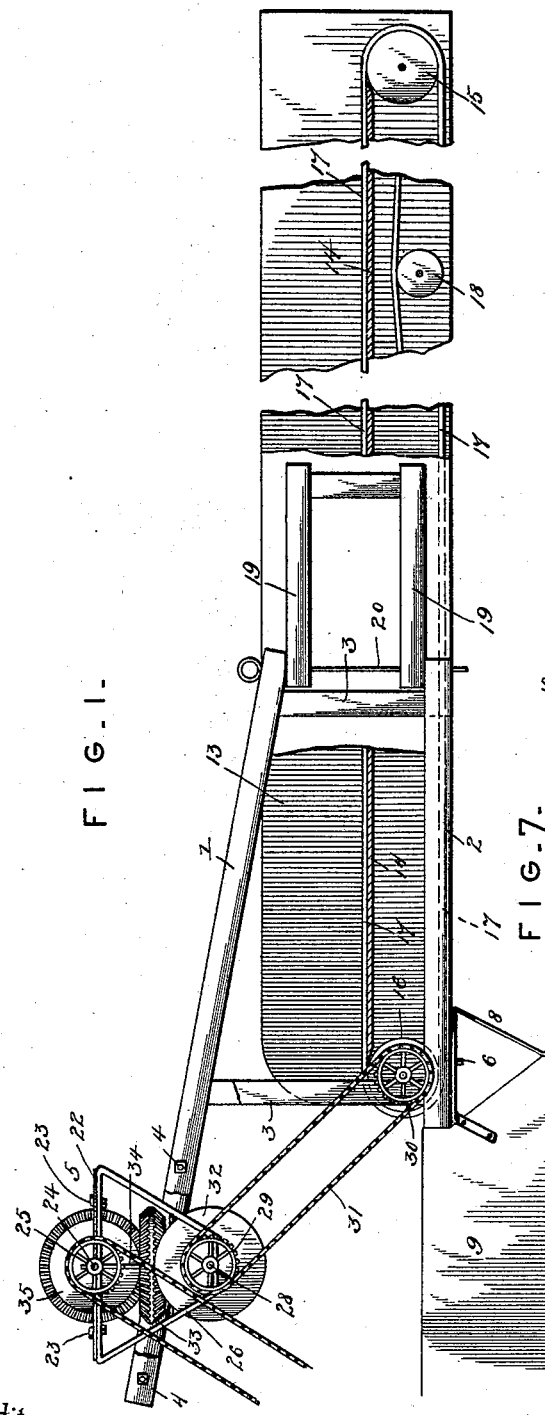
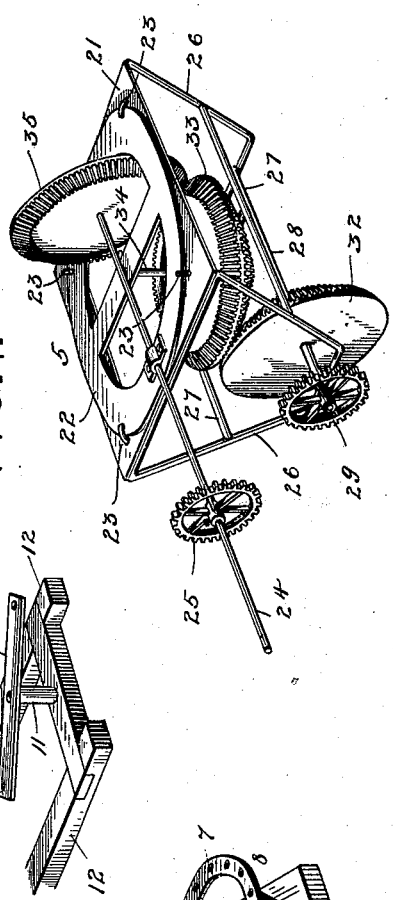
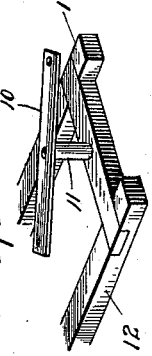
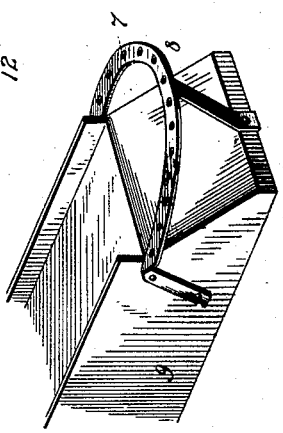
Witnesses
Harry L. Amer.
V. B. Hillyard.
By his Attorneys,
C. A. Snow & Co.
Inventor
Melvin J. Wise.

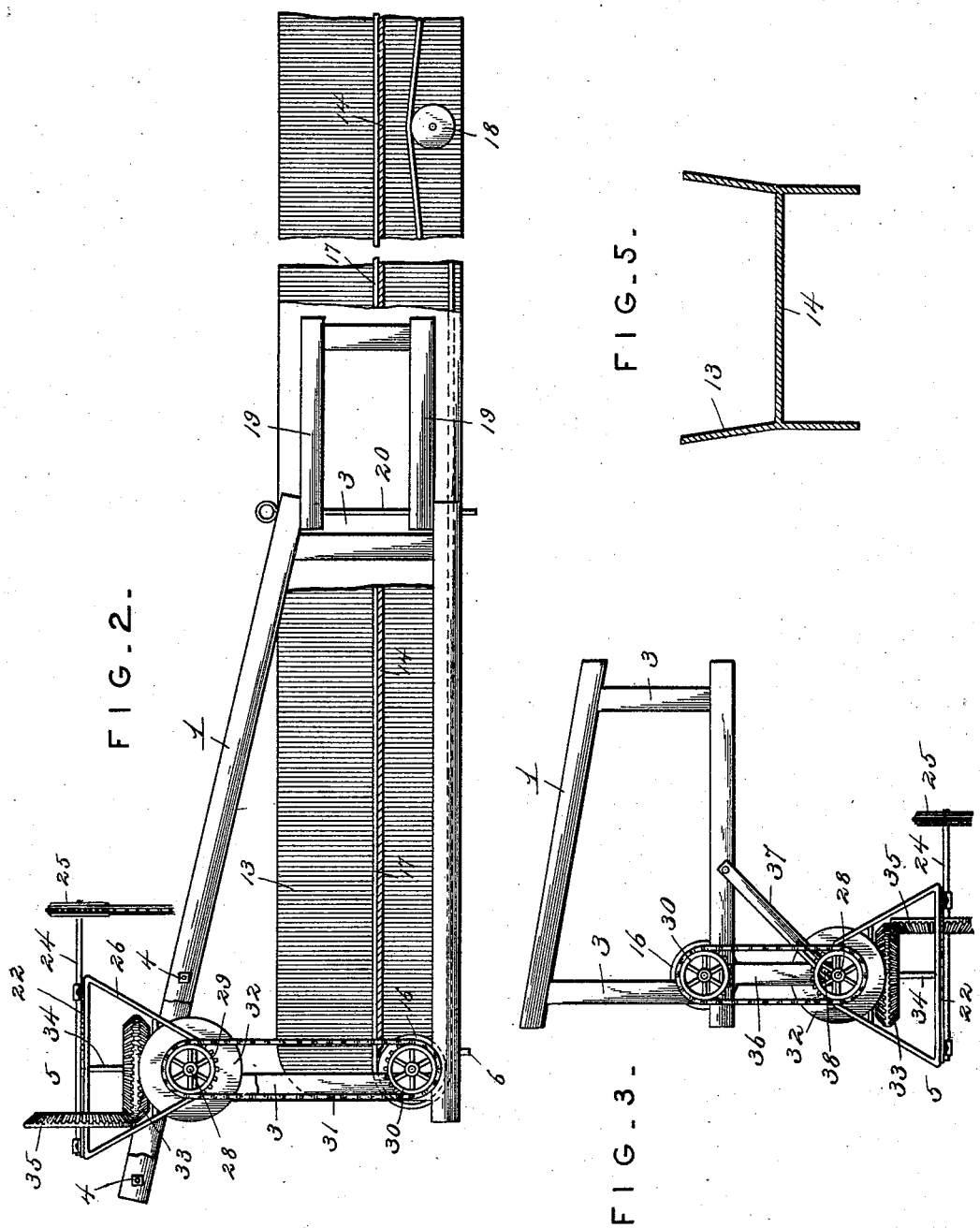

UNITED STATES PATENT OFFICE.

MELVIN J. WISE, OF ROBERTS, ILLINOIS.

FEEDER FOR CORN-SHELLERS.

SPECIFICATION forming part of Letters Patent No. 578,435, dated March 9, 1897.

Application filed May 8, 1896. Serial No. 590,770. (No model.)

*To all whom it may concern:*

Be it known that I, MELVIN J. WISE, a citizen of the United States, residing at Roberts, in the county of Ford and State of Illinois, have invented a new and useful Feeder for Corn-Shellers, of which the following is a specification.

This invention aims to provide an improved feeder for carrying corn on the cob from a bin or crib to a sheller for the purpose of shelling, and which is capable of being attached to the sheller at any angle, thereby admitting of the corn being supplied from any direction desired and as most convenient and obviating the necessity of placing the sheller at an end of the crib or bin only with the feed directly behind, as generally practiced. By this invention the corn on the cob is fed around, over, or by an intervening building or other obstruction.

A further purpose of the improvement is to devise a feeder which will be light-running, adapted to be used on any style of sheller, whether spring or cylinder, and which can be operated from a part of the sheller-operating mechanism at any adjusted position.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a side elevation showing the invention applied, the near side of the box or trough being broken away. Fig. 2 is a view similar to Fig. 1, showing the gearing-head differently related and its supporting-frame altered in construction to adapt the attachment for cylinder-shellers. Fig. 3 is a detail view showing the gearing-head below the frame. Fig. 4 is a perspective view of the gearing-head. Fig. 5 is a cross-section of the trough or box. Fig. 6 is a detail view of the end of a corn-sheller, showing the semicircular bar. Fig. 7 is a detail view of a different form of connection between the attachment and a corn-sheller.

Corresponding and like parts are referred to in the following description and indicated in the several views of the drawings hereto annexed by the same reference-characters.

The frame for supporting the gearing-head and to which the trough or box is attached is composed of similarly-constructed side pieces, each comprising an upper bar 1, a lower bar 2, and upright connecting-bars 3. The upper bars 1 incline with respect to the lower bars 2 and may be of equal length with the bars 2 or be extended at one end, according to the style of the corn-sheller with which the attachment is to be used. Transverse rods or bolts 4 connect the upper bars 1 near one end and are adapted to clamp the gearing-head 5 between the bars 1 in any adjusted position. This frame has pendent lugs 6, which are adapted to enter corresponding openings of a series of openings 7, formed in an approximately semicircular bar or plate 8, which is secured to the frame of the corn-sheller 9. By this means the attachment can be shifted to any angular adjustment relative to the corn-sheller. Instead of the lugs 6 a bar 10 may be secured to the lower bars 2 of the frame and is centrally apertured to receive the reduced end of a vertical post 11, which is secured to the frame 12 of a cylinder-sheller. By this means the attachment can be readily turned to any position about a vertical axis.

A trough or box 13 of suitable length extends between the corn-sheller and the bin or crib from which the ears of corn to be shelled are supplied and comprises side pieces and an elevated bottom 14. The portions of the side pieces above the bottom 14 oppositely flare or incline to admit of the ears of corn being fed to the box with greater ease. A pulley 15 is located at the receiving end of the trough or box, and a corresponding pulley 16 is placed at the delivery end of the box or trough, and an endless belt or carrier 17 passes around the pulleys 15 and 16, with its upper portion resting upon the bottom 14 and its lower portion coming below the said bottom and supported at intervals in its length by rollers 18, which prevent the lower portion of the carrier or belt from sagging and coming in contact with the ground. This carrier or belt is approximately of a width corresponding to the distance between the side pieces of the box or trough, and its upper portion, being supported by the bottom 14, is prevented from turning and sagging and is thereby compelled to move the ears of corn to the sheller. An end portion of the box or trough is fitted between the side pieces of the frame carrying the gearing-head, and the lower edge portion of the side pieces is removed to receive a lower side bar 2 and be supported thereby. Strips 19 are secured to the sides of the trough or box and are adapted to overlap and come between the end portions of the bars 1 and 2, and pins or rods 20 pass through corresponding openings in the overlapping end portions of the strips and bars, so as to connect them together in a positive manner.

The gearing-head 5 is composed of similar side pieces of triangular form, which are connected at one of their bases by a rectangular-shaped plate or frame 21, and upon this plate or frame is placed an annulus 22 in such a manner as to be capable of being turned, said annulus being held in place and secured in an adjusted position by hooked bolts 23. A shaft 24 is journaled in bearings provided on the annulus at diametrically opposite points, and a sprocket-wheel 25 is slidably mounted upon the projecting portion of the shaft 24 and is held upon the latter in an adjusted position by a binding-screw passing laterally through a threaded opening in the hub of the sprocket-wheel. By this means the sprocket-wheel 25 can be moved so as to aline with the sprocket-wheel of the corn-sheller, from which it derives its motion through the intervention of a sprocket-chain, as will be readily comprehended. The triangular side pieces 26 of the gearing-head 5 are strengthened and braced by transverse bars 27, so as to be capable of resisting the clamping action of the bars 1. A shaft 28 is journaled in bearings provided at the angles of the side pieces opposite the frame or plate 21, and has a sprocket-wheel 29 secured to its projecting end and which is in connection with a corresponding sprocket-wheel 30 on a journal of the pulley 16 by means of a sprocket-chain 31. A gear-wheel 32 is mounted upon the shaft 28 and meshes with a toothed portion of a twin gear 33, carried by a vertical shaft 34. A gear-wheel 35, secured to the shaft 24, meshes with a toothed portion of the said twin gear 33 and transmits motion thereto, which motion is imparted to the endless carrier or belt 17 by means of the gearing just described. By reason of the annulus 22 and its adjustable connection with the gearing-head the shaft 24 can be turned to any angle, so that the sprocket-wheel 25 may come in line with the sprocket-wheel from which it receives its initial movement. This construction also admits of the shaft 24 remaining parallel with the part from which it is driven, while the attachment itself can be adjusted to any required angle.

In some instances it may be desirable to suspend the gearing-head from its supporting-frame, and to this end a hanger 36 is employed and is mounted upon the shaft 28 and the journals of the pulley 16, and in order that the hanger may be secured at any angular adjustment a bar 37 is interposed between the hanger 36 and the frame and is slotted at one end to receive the binding-screw 38 or other suitable fastening by means of which the parts are secured in an adjusted position.

Having thus described the invention, what is claimed as new is—

1. In combination, a box or trough comprising side pieces having their upper portions flaring and a piece interposed between and connecting the side pieces along the line of flexion intermediate of their top and bottom edges, forming an elevated bottom, pulleys at the ends of the box, an endless carrier supported by the pulleys and the elevated bottom and having its lower portion completely inclosed by the lower portion of the side pieces, and rollers located at intervals in the length of the box and journaled to the side pieces thereof below the said bottom and adapted to support the lower portion of the said endless carrier above the lower edges of the side pieces, substantially as set forth.

2. The combination with a frame having projecting portions, of a box or trough, strips applied to the sides of the box or trough and adapted to overlap the projecting portions of the frame, and rods passing through corresponding openings in the overlapping portions of the frame and strips, substantially as and for the purpose set forth.

3. In combination, a frame, a carrier having connection with the frame, a gearing-head for transmitting motion to the carrier, means for adjustably connecting the gearing-head with the frame, an annulus supported by the gearing-head and adapted to be turned thereon, means for positively securing the annulus in an adjusted position, and a shaft mounted in bearings provided on the annulus and meshing with the gearing supported by the said head, and adapted to be driven from a suitable source of power, substantially in the manner and for the purpose described.

4. In combination, a frame, a carrier connected with the frame, a gearing-head having adjustable connection with the frame and comprising similar side pieces of triangular form, a rectangular-shaped plate connecting the side pieces at one of their bases, transverse bars connecting the base portions of the said side pieces, a vertical shaft, a twin gear secured to the said shaft, a horizontal shaft, a gear-wheel secured to the horizontal shaft and meshing with a toothed portion of the twin gear and adapted to transmit motion to the carrier, a second horizontal shaft, a gear-wheel secured to the latter shaft and meshing with the other toothed portion of the said twin gear and adapted to be driven from a suitable source of power, and means for securing the last-mentioned shaft in an adjusted position, substantially in the manner set forth for the purpose described.

In testimony that I claim the foregoing as my own I have hereto affixed my signature in the presence of two witnesses.

MELVIN J. WISE.

Witnesses:
 HENRY VAN VELSON,
 E. J. ROBERTS.